United States Patent [19]

Sakuma

[11] Patent Number: 5,117,337

[45] Date of Patent: May 26, 1992

[54] VANITY MIRROR

[75] Inventor: Toranosuke Sakuma, Shimizu, Japan

[73] Assignee: Koito Manufacturing Co., Ltd., Tokyo, Japan

[21] Appl. No.: 732,473

[22] Filed: Jul. 18, 1991

[30] Foreign Application Priority Data

Jan. 16, 1991 [JP] Japan .................................. 3-15001

[51] Int. Cl.⁵ .............................................. B60Q 1/00
[52] U.S. Cl. ...................................... 362/74; 362/137; 362/144; 362/294; 296/97.5
[58] Field of Search ................. 362/74, 135, 137, 140, 362/141, 142, 144, 234; 296/97.1, 97.5

[56] References Cited

U.S. PATENT DOCUMENTS

| | | | |
|---|---|---|---|
| 4,213,169 | 7/1980 | Kempers | 362/74 |
| 4,227,241 | 10/1980 | Marcus | 362/140 |
| 4,227,242 | 10/1980 | Marcus | 362/140 |
| 4,479,172 | 10/1984 | Connor | 362/135 |
| 4,491,899 | 1/1985 | Fleming | 362/74 |
| 4,909,562 | 3/1990 | Sakuma et al. | 296/97.5 |
| 5,003,438 | 3/1991 | Yoshida | 362/135 |
| 5,022,699 | 6/1991 | Yoshida | 296/97.5 |
| 5,028,052 | 7/1991 | Sakuma et al. | 362/74 |

Primary Examiner—Richard R. Cole
Attorney, Agent, or Firm—Koda and Androlia

[57] ABSTRACT

A vanity mirror of the type including a mirror, an illuminating portion having a lamp, and a cover for covering and exposing the front surface of the mirror, with the lamp being turned on and off in response to opening and closing of the cover. A lens covering the front side of the lamp is displaceable in fore and aft directions, and a mechanism is provided for displacing the lens in response to opening and closing of the cover, such that when the cover is opened the lens displaces forward and the lamp is turned on, and that when the cover is closed the lens retracts and the lamp is turned off.

7 Claims, 12 Drawing Sheets

VANITY MIRROR

BACKGROUND OF THE INVENTION

This invention relates to a vanity mirror of the type being mounted particularly on a sun visor of a motor vehicle.

Particularly, the vanity mirror of the present invention is of the type including a mirror, an illuminating portion having a lamp, and a cover for covering and exposing the front surface of the mirror.

Various proposals have been made with respect to vanity mirrors mounted on sun visors of motor vehicles and of the type including a mirror, an illuminating portion having a lamp, and a cover for covering and exposing the front surface of the mirror.

It is strongly required to reduce the thickness of the sun visor for increasing the inner space of the vehicle and improving the living condition in the vehicle. Accordingly, it is also required to reduce the thickness of the vanity mirror. There is a problem in reducing the thickness of the vanity mirror that the lens of the illuminating portion has usually been formed of polycarbonate resin which shows a tendency to deform due to the heat of the lamp. Thus, it has been required to provide a predetermined space between the lens and the lamp which has defined a limit for reducing the thickness of the vanity mirror.

SUMMARY OF THE INVENTION

According to the invention, there is provided a vanity mirror of the type including a mirror, an illuminating portion having a lamp, and a cover for covering and exposing the front surface of the mirror, with the lamp being turned on and off in response to opening and closing of the cover, wherein a lens covering the front side of the lamp is displaceable in fore and aft directions, and a mechanism is provided for displacing the lens in response to opening and closing of the cover, such that when the cover is opened the lens displaces forward and the lamp is turned on.

Thus, according to the invention, when the lamp is turned on the lens moves forward thereby separating from the lamp and, when the lamp is turned off the lens is moved toward the lamp thereby reducing the thickness of the vanity mirror to the minimum.

These and other features, advantages and objects of the present invention will become apparent upon reading the following description together with reference to drawings, in which:

DETAILED DESCRIPTION OF PREFERRED EMBODIMENT

Figure 12:
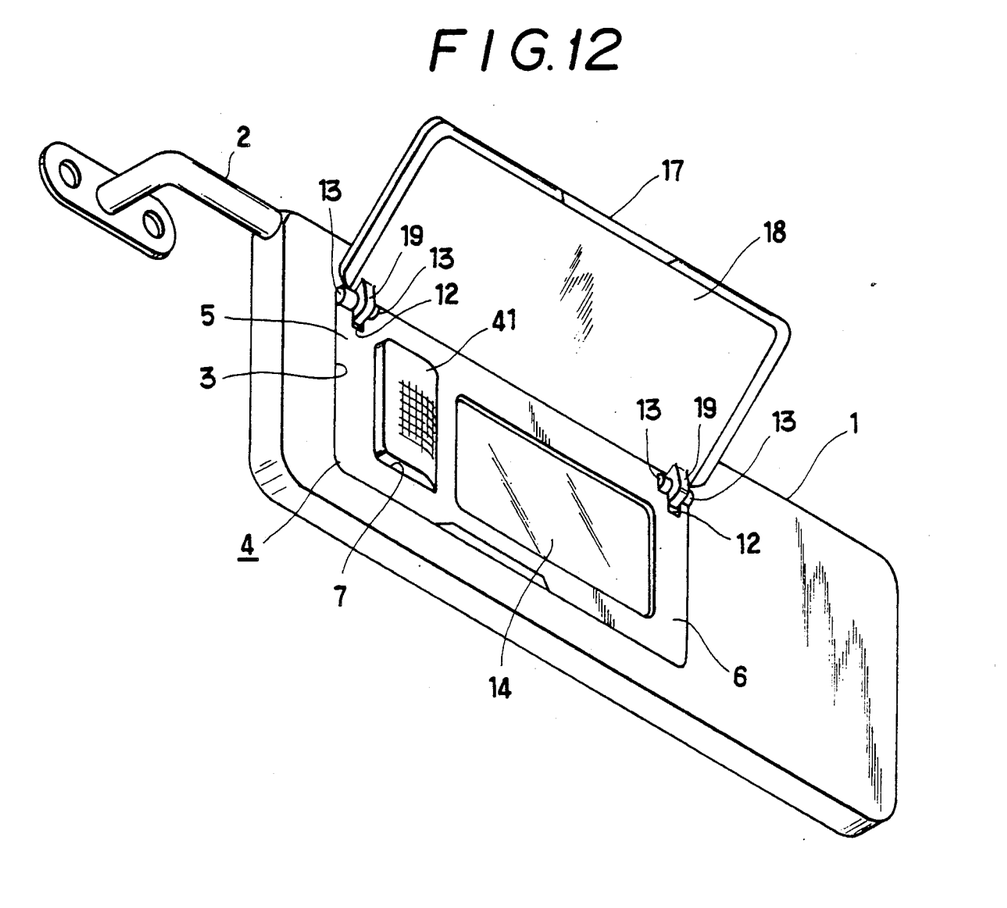
FIG. 12 is a schematic perspective view of a sun visor having a vanity mirror.

Shown at numeral 1 in FIG. 12 is a sun visor mounted in a motor vehicle, and one side edge of the sun visor 1 is rotatably supported on a supporting bar 2 with one end of which being supported on a frame of the motor vehicle not shown in the drawing.

An oblong recess 3 is formed in one side surface of the sun visor 1 as shown in FIG. 12, and a vanity mirror 4 is mounted on the sun visor 1 and being fitted in the recess 3.

Shown at 5 is a body of the vanity mirror 4 and is formed of a synthetic resin material.

Shown at 6 is a front surface portion of the vanity mirror 4 and has the configuration of a horizontally extending oblong plate having a vertically extending oblong opening 7 at a position near to one side and a horizontally extending large oblong window 8 as shown in FIG. 12.

A short rib 9 is formed on the rear surface of the front surface portion 6 and around the opening of the window 8.

Figure 1:
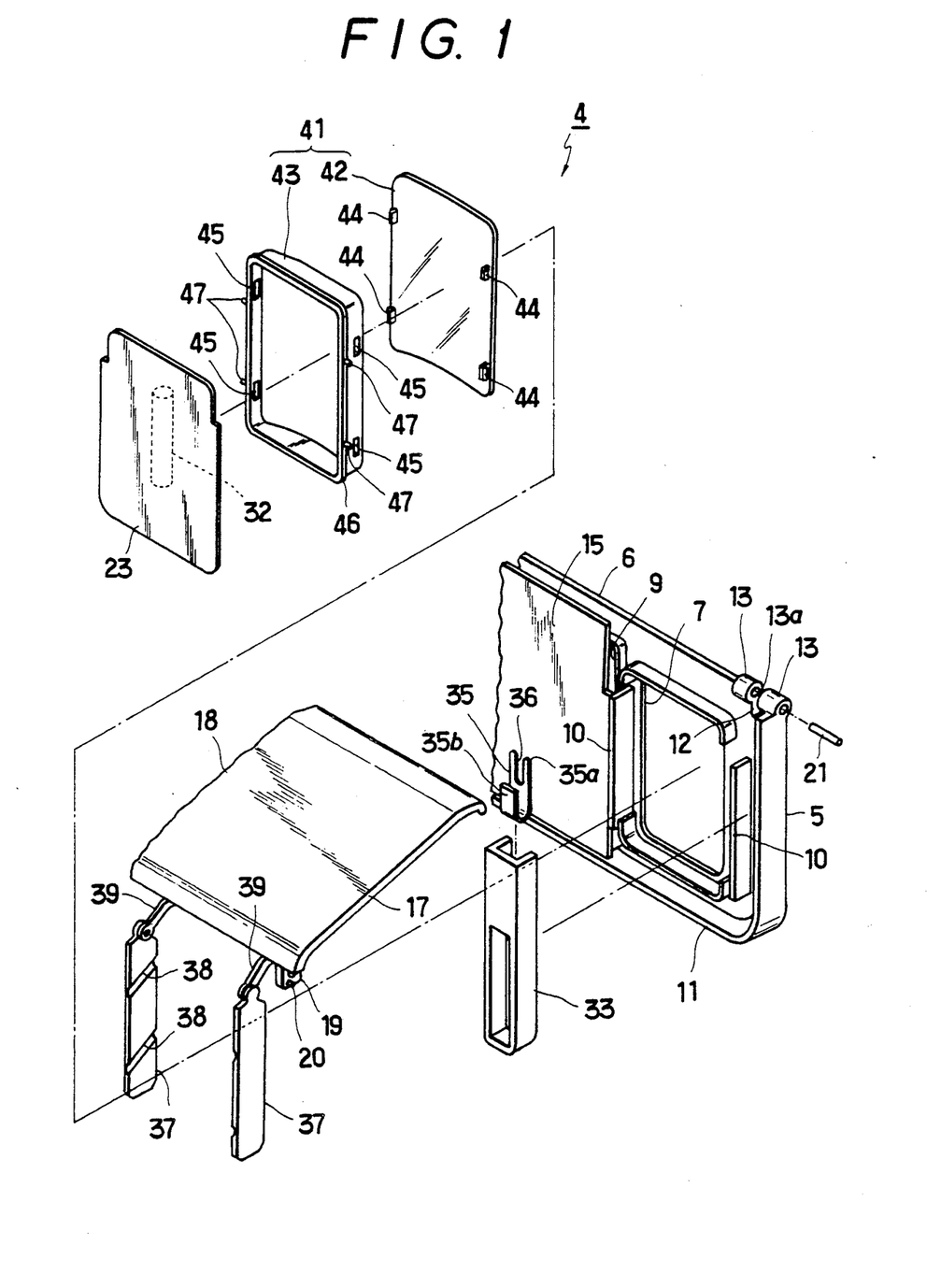
FIG. 1 is an enlarged exploded perspective view of a portion of a vanity mirror according to the invention.

Partition walls 10 and 10 are formed on the rear surface of the front surface portion 6 and at the location near to side edges of the opening 7 as shown in FIG. 1.

Further, peripheral wall 11 is formed on left, right and lower side edges of the front surface portion 6 to extend rearward.

Figure 2:
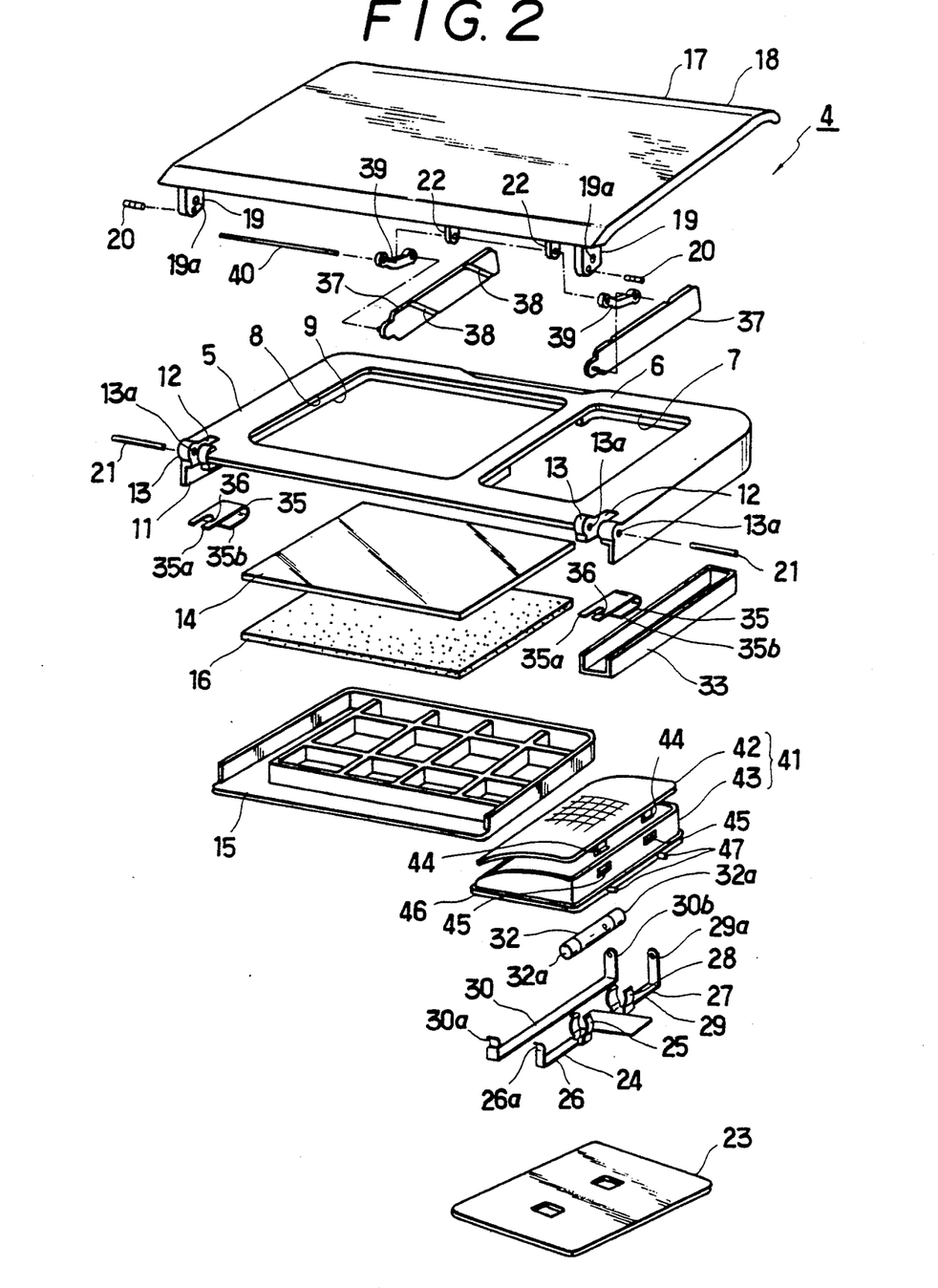
FIG. 2 is an exploded perspective view of the vanity mirror of FIG. 1.
Figure 4:
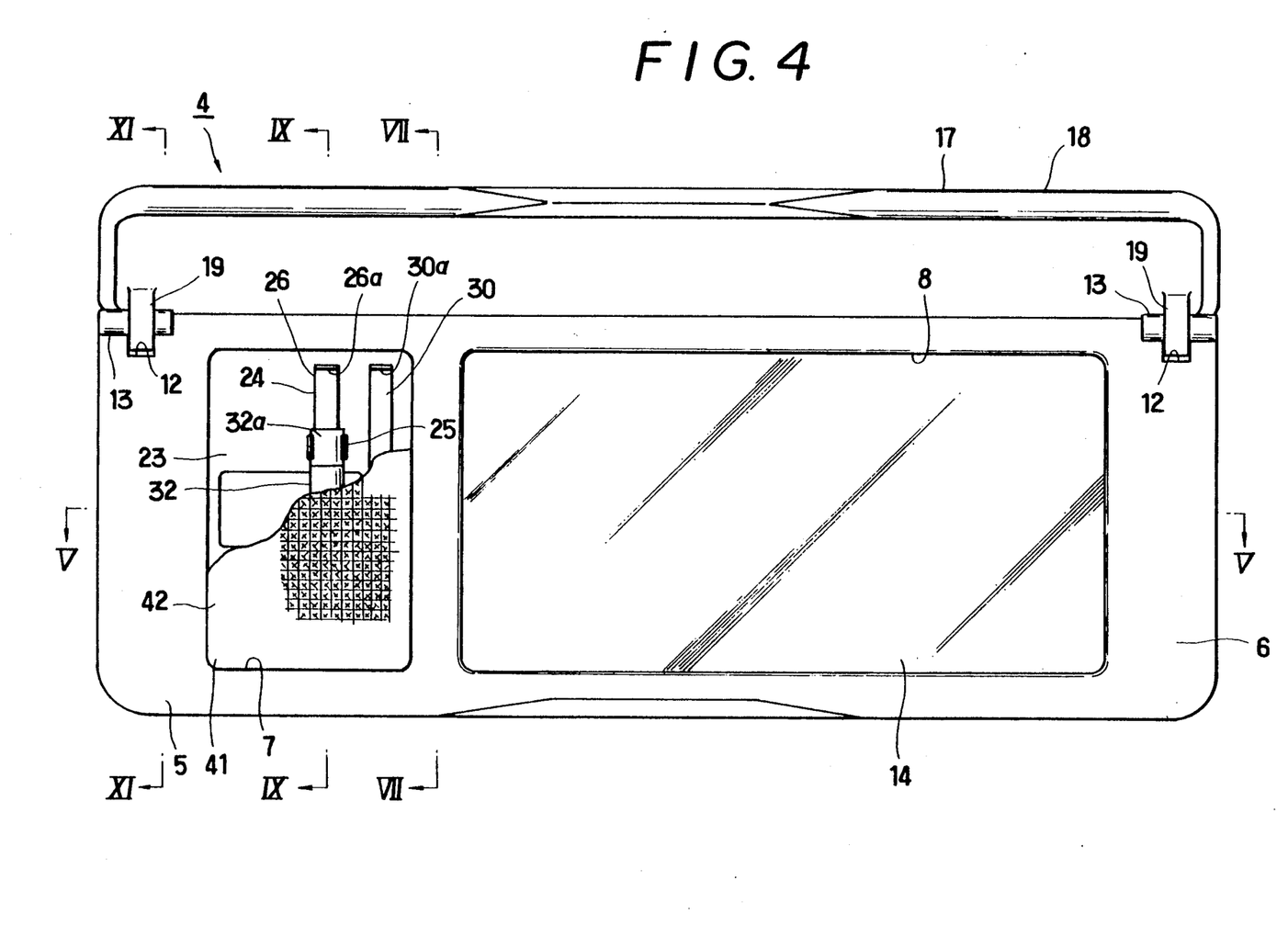
FIG. 4 is a front view with the cover being opened.
Figure 5:
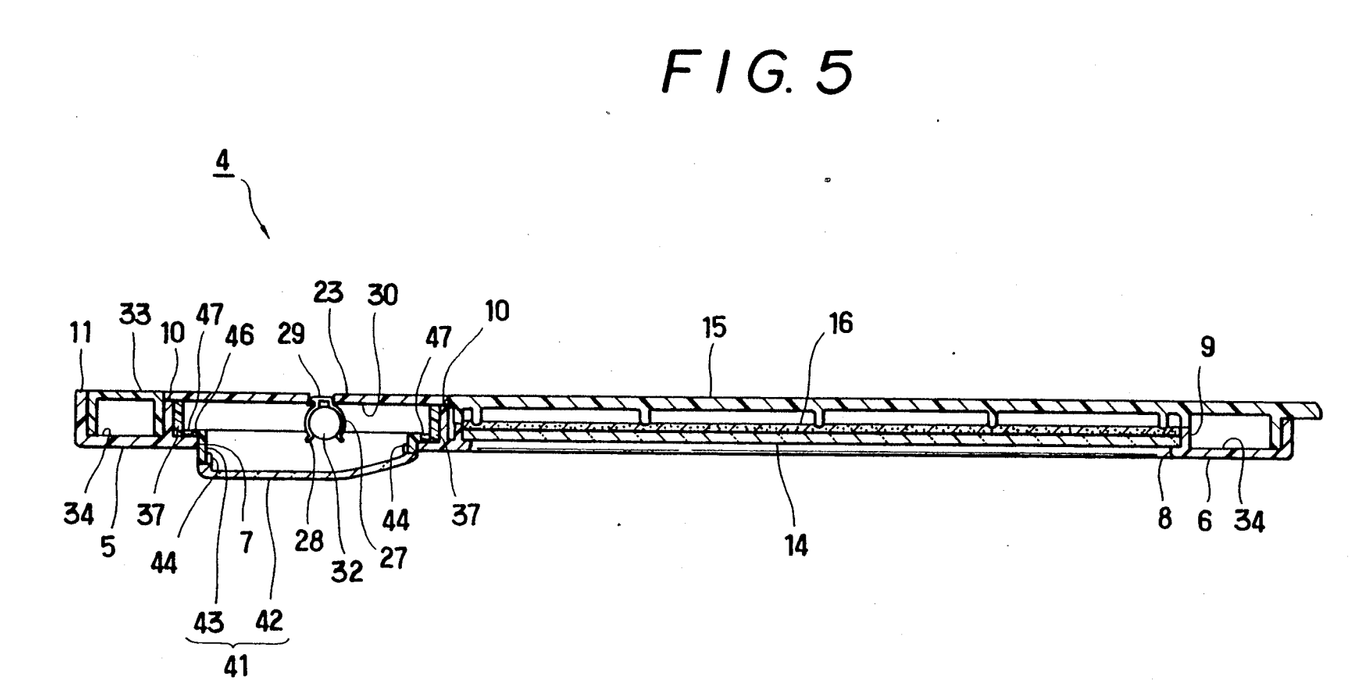
FIG. 5 is a sectional view taken along line V—V in FIG. 4.

There are formed vertically extending cutouts 12 and 12 in the upper edge of the front surface portion 6 as shown in FIGS. 1, 2 and 4, and thick thickness portions 13, 13, . . . are formed adjacent to the upper end portions of the cutouts 12 and 12 and in laterally opposing relationship. Supporting openings 13a, 13a, . . . are formed respectively in the thick thickness portions 13, 13, . . . to receive support pins 21 and 21 respectively.

Shown at numeral 14 is a mirror having a horizontally extending oblong configuration, with the peripheral portion being fitted from the rear side of the body 5 into the rib 9 so as to abut with the edge of the opening 8, and the rear surface of the mirror 14 is retained by a back body 15 which also is mounted on the body 5. Preferably, the back body 15 is formed of synthetic resin material and is connected to the body 5 by such as supersonic welding process. A cushion member such as a sponge sheet 16 is interposed between the rear surface of the mirror 14 and the back body 15.

Shown at 17 is a cover for opening and closing the front surface of the body 5, and includes a generally planer main portion 18. Preferably, the cover 17 is also formed of a synthetic resin material.

Figure 3:
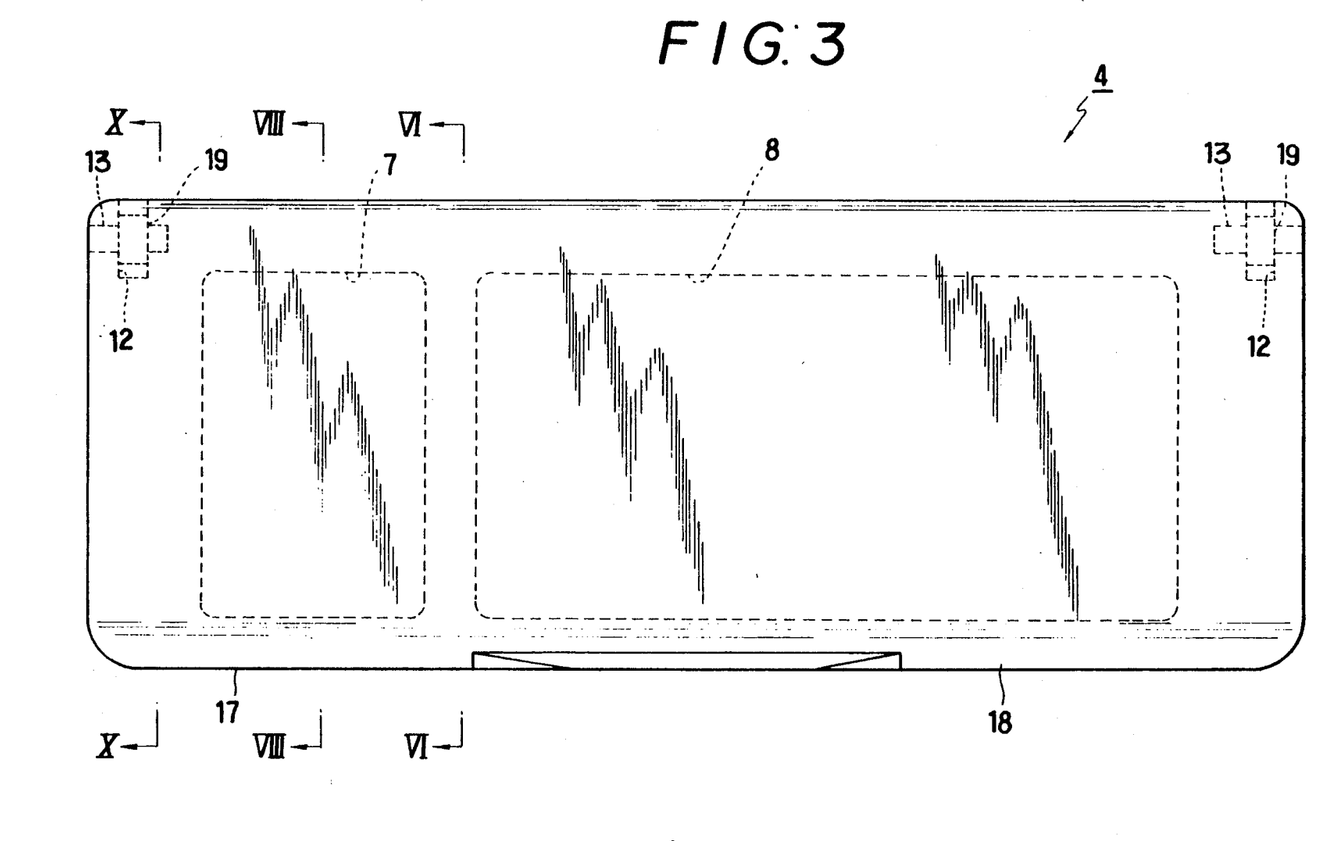
FIG. 3 is a front view of the vanity mirror of FIG. 2 with the cover being closed.

There are formed supporting pieces 19 and 19 on the rear surface of the main portion 18 and respectively near to the upper edge and near to the left and right edges as shown in FIGS. 2 and 3. Supporting openings 19a and 19a are formed in the supporting pieces 19 and 19 respectively.

Actuated pins 20 and 20 are respectively mounted on the supporting pieces 19 and 19 as shown in FIGS. 1 and 2 with opposite ends thereof projecting from opposite side surfaces of the supporting pieces 19 and 19 respectively.

By locating the supporting pieces 19 and 19 of the cover 17 respectively in the upper end portions of the cutouts 12 and 12 in the cover 5, and by inserting supporting pins 21 and 21 which are respectively mounted between the supporting openings 13a and 13a and between the supporting openings 13a and 13a respectively through supporting openings 19a and 19a in the supporting pieces 19 and 19 respectively, the upper end portion of the cover 17 is rotatably supported on the upper end portion of the body 5.

There are formed connecting pieces 22 and 22 on the rear surface of the cover 17 at positions near to the upper edge and spaced in the left and right directions and near to one side as shown in FIGS. 2 and 4.

Shown at 23 is a back board of a vertically extending and generally oblong plate like configuration, and formed preferably of synthetic resin material. The back board 23 is secured to the body 5 with opposite side edge portions of the back board 23 abutting respectively with the rear ends of the partition walls 10 and 10 of the body 5 respectively.

Three contacting members are secured on the front surface of the back board 23.

A first contacting member 24 is formed of an electric conductive material and integrally with a lamp holder 25 and with a contacting piece 26. The lamp holder 25 is secured to the front surface of the back board 23 at the location upper from the central portion thereof, and the contacting piece 26 extends upward from the lamp holder 25 with the upper end portion 26a being bent forward.

A second contacting member 27 is formed of an electric conductive material and integrally with a lamp holder 28 and with a contacting piece 29. The lamp holder 28 is secured to the front surface of the back board 23 at the location lower from the central portion thereof, and the contacting piece 29 extends downward from the lamp holder 28 with the lower end portion 29a being bent forward.

A third contacting member 30 is formed of an electric conductive material in the form of vertically extending band like form, and is located near to one side in the front surface of the back board 23 with the upper end portion 30a and the lower end portion 30b being bent forward.

The lower end portion 29a of the contacting piece 29 of the second contacting member 27 and the lower end portion 30b of the third contacting member 30 are connected through wiring means (not shown in the drawings) to electric source.

Shown at numeral 32 is a tubular lamp, and base portions 32a and 32a being formed on opposite ends of the lamp 32 are retained respectively and independently on the lamp holder 25 and 28.

Shown at numeral 33 is an auxiliary back body being formed preferably of synthetic resin material and is secured to the rear surface of the body 5 and between one of side edges and one of the partition walls 10.

Shown at 34 and 34 are recess portions formed between respective end portions of the body 5 and the back body 15 and the auxiliary back body 33 and have openings in the upper ends. The cutouts 12 and 12 are respectively located in the upper end portions of the front surfaces of the recess portions 34 and 34 respectively.

Shown at 35 and 35 are click springs being respectively formed of leaf spring material in the form of generally U-shaped configuration in the side view, and respectively comprise front side portions 35a and 35a and rear side portions 35b and 35b which are respectively shorter than front side portions 35a and 35a. There are formed cutouts 36 and 36 in the upper ends of the front side portions 35a and 35a of the springs 35 and 35 respectively.

The click springs 35 and 35 are received in the recess portions 34 and 34 respectively, with portions of the supporting pieces 19 and 19 of the cover 17 being located in the cutouts 36 and 36. And portions of the springs 35 and 35 being defined by cutouts 36 and 36 contact resiliently with the actuated pins 20 and 20 respectively from the rear side.

Figure 10:
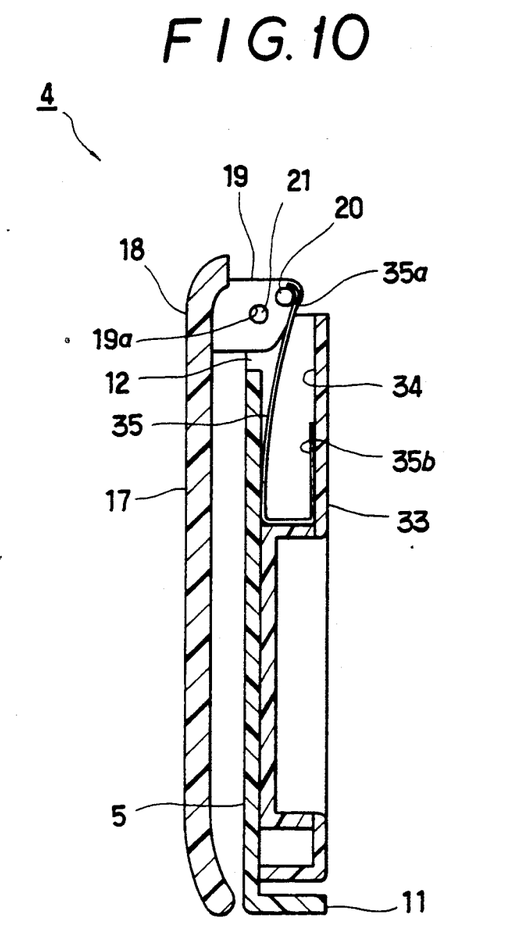
FIG. 10 is an enlarged sectional view taken generally along line X—X in FIG. 3.

In the closed condition of the cover 17 covering the front surface of the body 5, as shown in FIG. 10, the actuated pins 20 and 20 being located upper side of the fulcrum of rotation (supporting pins 21 and 21) are urged resiliently by the front side portions 35a and 35a of the click springs 35 and 35, whereby the cover 17 receives the torque in the closing direction or in counterclockwise direction in FIG. 10, and the cover 17 is maintained in the closed condition.

Figure 11:
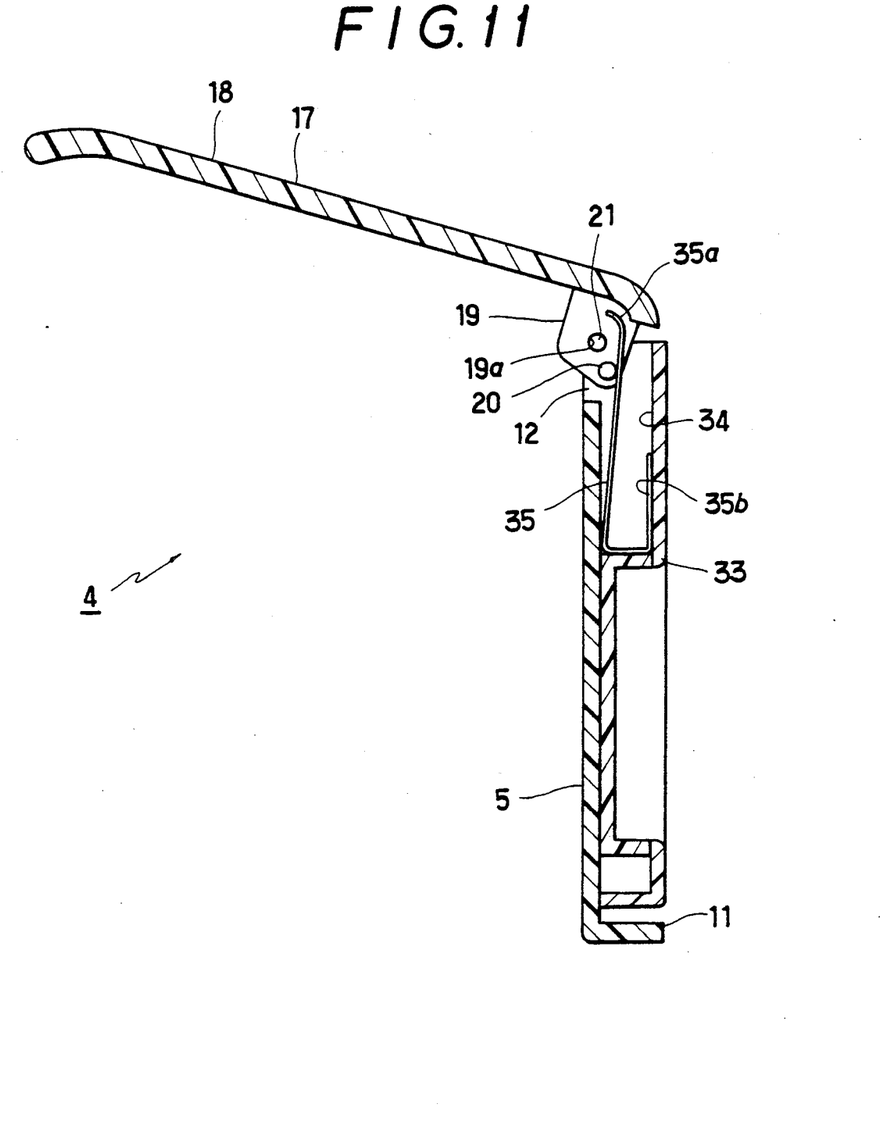
FIG. 11 is an enlarged sectional view taken generally along line XI—XI in FIG. 4.

In FIG. 11, the actuated pins 20 and 20 are located lower side of the fulcrum of rotation and are urged resiliently by the front side portions 35a and 35a of the click springs 35 and 35, whereby the cover 17 receives the torque in the opening direction or in the clockwise direction in FIG. 11, and the cover 17 is maintained in the open condition.

Shown at numerals 37 and 37 are slide members having the form of vertically extending plate like configuration as viewed in the transverse direction and are respectively slideably supported on and between the body 5 and the back body 23 and inside of the partition walls 10 and 10. Further, there are formed slide grooves 38, 38, . . . in mutually opposing surfaces of the slide members 37 and 37 as shown in FIGS. 1 and 2. The grooves 38, 38, . . . are inclined in rearward and downward direction.

Shown at numerals 39 and 39 are links with opposite ends being respectively rotatably connected to the connecting pieces 22 and 22 of the cover 17 and to upper end portions of the slide members 37 and 37 respectively. Shown at 40 is a shaft formed of electric conductive material, and extends between the connecting pieces 22 and 22 of the cover 17. The shaft 40 connects rotatably one end portions of the link 39 and 39 with the connecting pieces 22 and 22 respectively.

When the cover 17 is in the closed position, the slide members 37 and 37 are respectively pulled upward through the links 39 and 39 are located at the uppermost positions in the range of displacement, and when the cover 17 is in the open position, the slide members are respectively pushed downward through the links 39 and 39 and are located at the lowermost positions in the range of displacement.

Figure 8:
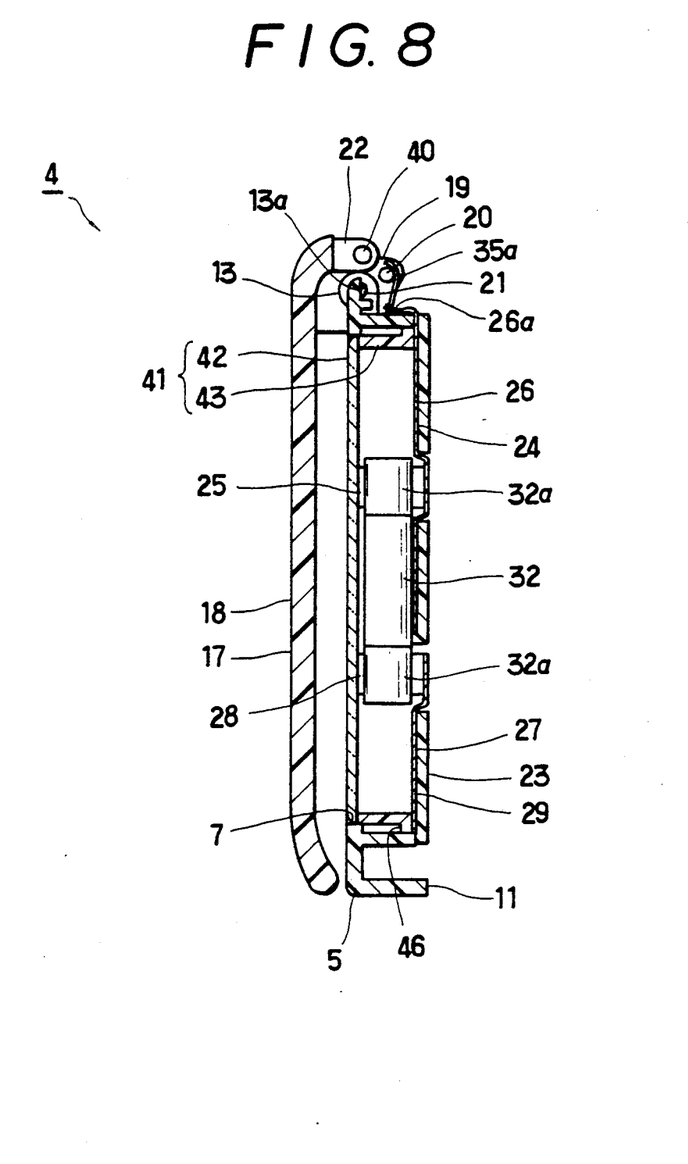
FIG. 8 is an enlarged sectional view taken generally along line VIII—VIII in FIG. 3.
Figure 9:
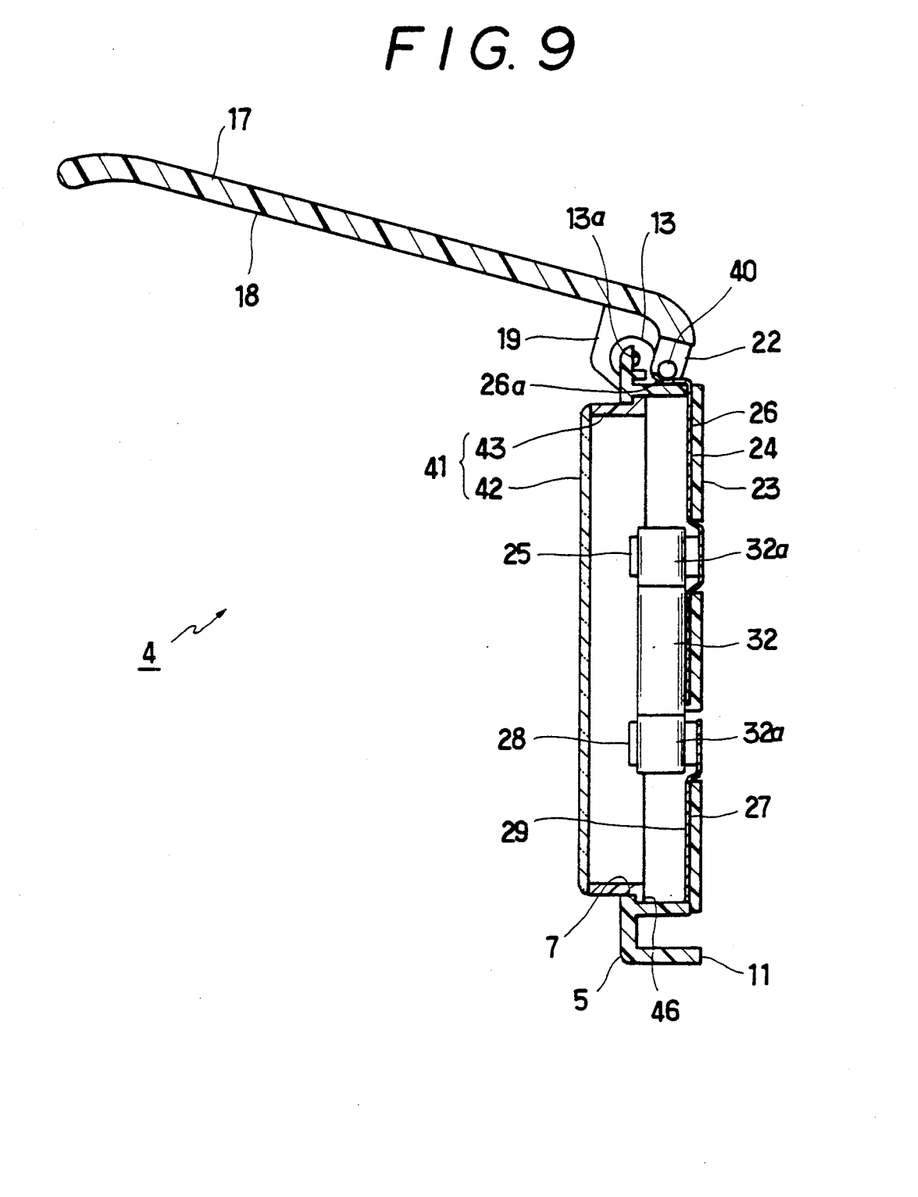
FIG. 9 is an enlarged sectional view taken generally along line IX—IX in FIG. 4.

When the cover 17 moves to the open position, the shaft 40 contacts, as shown in FIG. 9, with the upper end portions 26a and 30a of the first and third contacting members 24 and 30 thereby connecting electrically these contacting members 24 and 30 and energizing and lighting the lamp 32. When the cover 17 moves toward the closed position, the shaft 40 separates, as shown in FIG. 8, from the upper end portions 26a and 30a of the first and third contacting members 24 and 30 thereby distinguishing the lamp 32.

Shown at numeral 41 is a lens consisting of a cover portion 42 being formed of a transparent synthetic resin material and a frame member 43 formed of an opaque synthetic resin material.

Pawl pieces 44, 44, . . . are formed on the rear surface of the cover portion 42 at locations near to left and right side edges and projecting in the rear directions. There are formed in the left and right side plates of the frame member 43 retaining openings 45, 45, . . . at locations corresponding to the pawl pieces 44, 44, . . . of the cover portion 42. The cover portion 42 is mounted on the frame member 43 with the pawl pieces 44, 44, . . . engaging respectively with retaining openings 45, 45, . . . in the frame member 43 from inside, and the peripheral edge portion of the cover portion 42 abutting the front edge of the frame member 43. The size of the cover portion 42 and the frame member 43 is slightly smaller than that of the opening 7 in the body 5.

The frame member 43 is formed to have on the rear end of the outer peripheral surface a rim 46 with the size of which being slightly larger than that of the opening 7 in the body 5. Further, slide pins 47, 47, . . . are formed on left and right side surfaces of the rim 46 so as to project therefrom and to be slidably received respectively in slide grooves 38, 38, . . . in the slide members 37, 37, . . . respectively.

In mounting the lens 41 on the body 5, the frame member 43 is inserted into the opening 7 in the body 5 from the rear side and, slide pins 47, 47, . . . are received in slide grooves 38, 38, . . . respectively in slide members 37, 37, . . . and the cover portion 42 is mounted on the frame member 43 from the front side.

Figure 6:
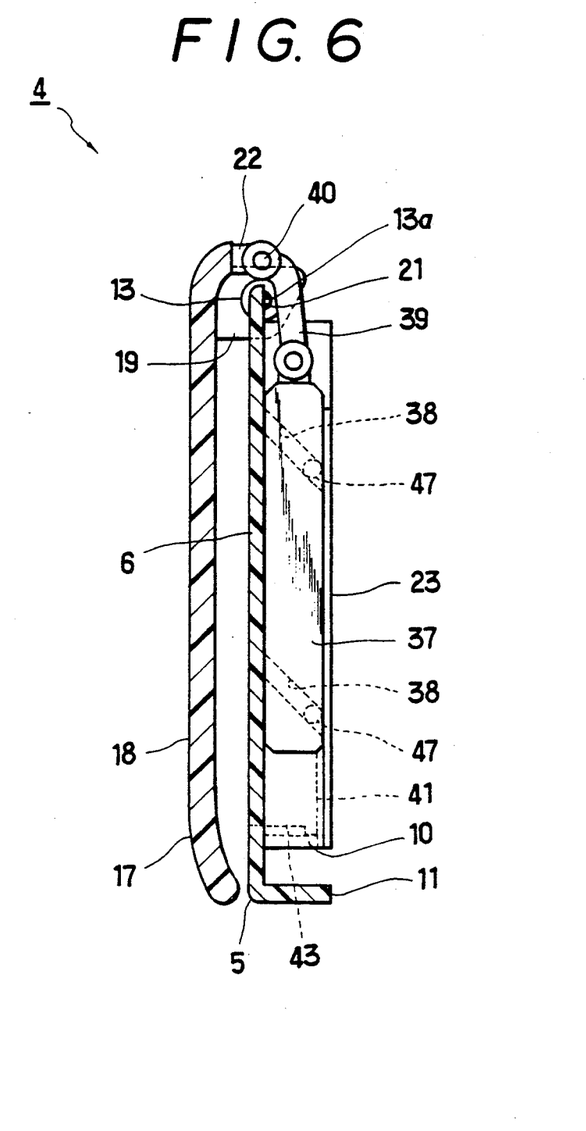
FIG. 6 is an enlarged sectional view taken generally along line VI—VI in FIG. 3.
Figure 7:
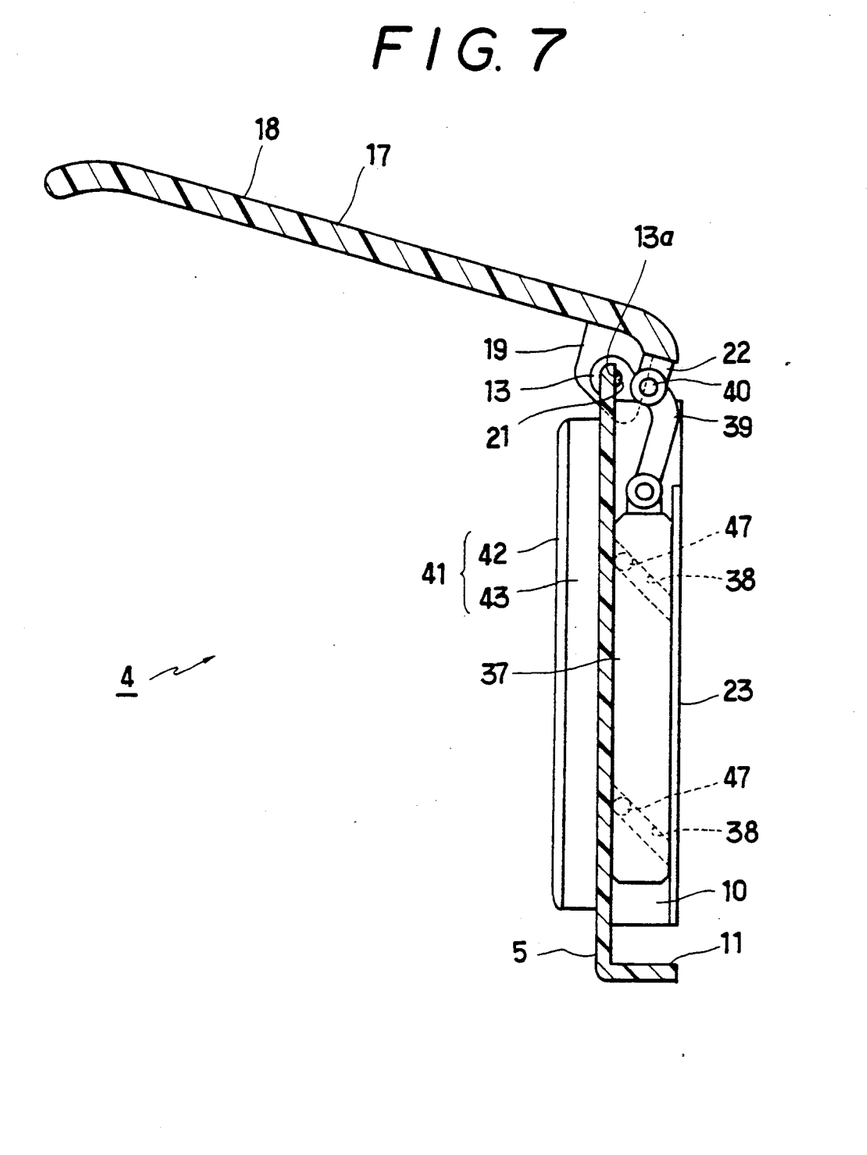
FIG. 7 is an enlarged sectional view taken generally along line VII—VII in FIG. 4.

When the cover 17 is in the closed position and slide members 37 and 37 are located at the uppermost position, the slide pins 47, 47, . . . of the lens 41 are located, as shown in FIG. 6, near to the rear ends of slide grooves 38, 38, . . . thus, the lens 41 takes a retracted position or position at which the cover portion 42 is located nearly equal to the front surface of the body 5. When the cover 17 moves toward the open position the slide members 37 and 37 move downward and slide pins 47, 47, . . . of the lens 41 move forward in the slide grooves 38, 38, . . . such that the lens 41 projects from the opening 7. When the cover 17 takes fully open position, the lens 41 projects from the opening 7 until the rim 46 of the lens 41 abuts with the rear side edge of the opening 7 and the cover portion 42 separates from the lamp 32 as shown in FIG. 7, and the lamp 32 is lighted.

As described heretofore, the vanity mirror according to the vanity mirror according to the invention includes a mirror, an illuminating portion having a lamp, and a cover for opening and closing the front surface of the mirror with the lamp being turned on and of in response to opening and closing the cover; wherein a lens covering the front side of the lamp is displaceable in fore and aft directions, and a mechanism is provided for displacing the lens in response to opening and closing of the cover, such that when the cover is opened the lens moves forward and the lamp is turned on.

Therefore, according to the invention, when the lamp is turned on the lens moves forward or in the direction separating from the lamp thereby eliminating the thermal effects due to the heat of the lamp, and when the lamp is turned off the lens moves in the rear direction thereby reducing the thickness of the vanity mirror in the non-usage condition.

Although the present invention has been described with respect to a preferred embodiment thereof, many variations and modifications will now become apparent for those skilled in the art. For example, the mechansim for supporting the mirror displaceably in fore and aft directions and the mechanism for displacing the mirror in fore and aft directions is not limited to those shown in the drawing. Various types of such mechanisms are known to public. It will be understood that the present invention may be embodied in other specific forms without departing from the spirit or essential attributes thereof and, accordingly, reference should be made to the appended claims, rather than to the foregoing specification, as indicating the scope of the invention.

What is claimed is:

1. A vanity mirror of the type including a mirror, an illuminating portion having a lamp, and a cover for covering and exposing a front surface of the mirror, with the lamp being turned on and off in response to opening and closing of the cover, wherein a lens covering a front side of the lamp is displaceable in fore and aft directions, and a mechanism is provided for displacing the lens in response to opening and closing of the cover, such that when the cover is opened the lens displaces forward and the lamp is turned on.

2. A vanity mirror according to claim 1, wherein the vanity mirror is mounted on a sun visor of a motor vehicle.

3. A vanity mirror according to claim 2, wherein the cover is rotatably mounted on a main body of the sun visor and around a hinge.

4. A vanity mirror according to claim 3, wherein the mechanism for displacing the lens in response to opening and closing the cover comprises a slide member being supported on opposite side portions of the body so as to displace in vertical directions and having inclined slide grooves in respective side surfaces opposing respective side edges of the lens, a link connecting the slide member with the cover, and slide pins projecting from opposite said side edges of the lens and engaging slidably with respective said slide grooves, whereby the lens displaces in fore and aft directions in response to opening and closing movement of the cover.

5. A vanity mirror according to claim 4, wherein at least two said slide grooves are formed in each said slide member, and at least four parallel said slide pins are provided for displaceably mounting the lens on the slide members.

6. A vanity mirror according to claim 3, wherein a sheet spring is mounted on the main body so as to urge the cover toward either of a full open position and a full close position.

7. A vanity mirror according to claim 3, wherein an electrically conductive shaft or rod is mounted on the cover so as to make an electric circuit for the lamp at a position near to a full open position of the cover, whereby in opening the cover the lens displaces forward and the lamp is turned on at a last stage of the forward movement of the lens, and in closing the cover the lamp is turned off during an early stage of the retracting movement of the lens.

* * * * *